United States Patent
Wilde

(10) Patent No.: US 6,661,948 B2
(45) Date of Patent: Dec. 9, 2003

(54) RECONFIGURABLE OPTICAL ADD AND DROP MODULES WITH SERVO CONTROL AND DYNAMIC SPECTRAL POWER MANAGEMENT CAPABILITIES

(75) Inventor: Jeffrey P. Wilde, Morgan Hill, CA (US)

(73) Assignee: Capella Photonics, Inc., San Jose, CA (US)

(*) Notice: Subject to any disclaimer, the term of this patent is extended or adjusted under 35 U.S.C. 154(b) by 0 days.

(21) Appl. No.: 10/143,651

(22) Filed: May 8, 2002

(65) Prior Publication Data

US 2002/0131698 A1 Sep. 19, 2002

Related U.S. Application Data

(63) Continuation-in-part of application No. 09/938,426, filed on Aug. 23, 2001.
(60) Provisional application No. 60/277,217, filed on Mar. 19, 2001.

(51) Int. Cl.[7] .................................................. G02B 6/28
(52) U.S. Cl. .............................. 385/24; 385/34; 385/37
(58) Field of Search ............................... 385/24, 37, 34

(56) References Cited

U.S. PATENT DOCUMENTS

| 5,629,790 A | 5/1997 | Neukermans et al. |
| 5,960,133 A | 9/1999 | Tomlinson |
| 5,974,207 A | 10/1999 | Aksyuk et al. |
| 6,204,946 B1 | 3/2001 | Aksyuk et al. |
| 6,205,269 B1 | 3/2001 | Morton |
| 6,259,841 B1 * | 7/2001 | Bhagavatula ............... 385/47 |
| 6,263,127 B1 * | 7/2001 | Dragone et al. ............ 385/24 |
| 6,263,135 B1 | 7/2001 | Wade |
| 6,289,155 B1 | 9/2001 | Wade |
| 6,381,387 B1 * | 4/2002 | Wendland, Jr. ............. 385/37 |
| 6,415,073 B1 * | 7/2002 | Cappiello et al. ........... 385/24 |
| 6,418,250 B1 | 7/2002 | Corbosiero et al. |

* cited by examiner

Primary Examiner—Hung N. Hgo
(74) Attorney, Agent, or Firm—Gray Cary Ware & Freidenrich LLP

(57) ABSTRACT

This invention provides a novel wavelength-separating-routing (WSR) apparatus that uses a diffraction grating to separate a multi-wavelength optical signal by wavelength into multiple spectral channels, which are then focused onto an array of corresponding channel micromirrors. The channel micromirrors are individually controllable and continuously pivotable to reflect the spectral channels into selected output ports. As such, the inventive WSR apparatus is capable of routing the spectral channels on a channel-by-channel basis and coupling any spectral channel into any one of the output ports, thereby constituting a dynamic optical drop module (RODM). By operating an RODM in reverse, a dynamic optical add module (ROAM) is also provided. The RODM (or ROAM) of the present invention may be further equipped with servo-control and power-management capabilities. Such RODMs and ROAMs can be used as building blocks to construct dynamically reconfigurable optical add-drop multiplexers (OADMs) and other WDM optical networking systems.

38 Claims, 12 Drawing Sheets

US 6,661,948 B2

RECONFIGURABLE OPTICAL ADD AND DROP MODULES WITH SERVO CONTROL AND DYNAMIC SPECTRAL POWER MANAGEMENT CAPABILITIES

CROSS-REFERENCE TO RELATED APPLICATIONS

This application is a Continuation-in part of U.S. patent application Ser. No. 09/938,426, filed Aug. 23, 2001, which is incorporated herein by reference in its entirety for all purposes, and which claims priority from U.S. Provisional Patent Application No. 60/277,217, filed on Mar. 19, 2001.

FIELD OF THE INVENTION

This invention relates generally to optical communication systems. More specifically, it relates to a novel class of dynamically reconfigurable optical add-drop multiplexers (OADMs) for wavelength division multiplexed optical networking applications.

BACKGROUND

As fiber-optic communication networks rapidly spread into every walk of modern life, there is a growing demand for optical components and subsystems that enable the fiber-optic communications networks to be increasingly scalable, versatile, robust, and cost-effective.

Contemporary fiber-optic communications networks commonly employ wavelength division multiplexing (WDM), for it allows multiple information (or data) channels to be simultaneously transmitted on a single optical fiber by using different wavelengths and thereby significantly enhances the information bandwidth of the fiber. The prevalence of WDM technology has made optical add-drop multiplexers indispensable building blocks of modern fiber-optic communication networks. An optical add-drop multiplexer (OADM) serves to selectively remove (or drop) one or more wavelengths from a multiplicity of wavelengths on an optical fiber, hence taking away one or more data channels from the traffic stream on the fiber. It further adds one or more wavelengths back onto the fiber, thereby inserting new data channels in the same stream of traffic. As such, an OADM makes it possible to launch and retrieve multiple data channels (each characterized by a distinct wavelength) onto and from an optical fiber respectively, without disrupting the overall traffic flow along the fiber. Indeed, careful placement of the OADMs can dramatically improve an optical communication network's flexibility and robustness, while providing significant cost advantages.

Conventional OADMs in the art typically employ multiplexers/demultiplexers (e.g, waveguide grating routers or arrayed-waveguide gratings), tunable filters, optical switches, and optical circulators in a parallel or serial architecture to accomplish the add and drop functions. In the parallel architecture, as exemplified in U.S. Pat. No. 5,974,207, a demultiplexer (e.g., a waveguide grating router) first separates a multi-wavelength signal into its constituent spectral components. A wavelength switching/routing means (e.g., a combination of optical switches and optical circulators) then serves to drop selective wavelengths and add others. Finally, a multiplexer combines the remaining (i.e., the pass-through) wavelengths into an output multi-wavelength optical signal. In the serial architecture, as exemplified in U.S. Pat. No. 6,205,269, tunable filters (e.g., Bragg fiber gratings) in combination with optical circulators are used to separate the drop wavelengths from the pass-through wavelengths and subsequently launch the add channels into the pass-through path. And if multiple wavelengths are to be added and dropped, additional multiplexers and demultiplexers are required to demultiplex the drop wavelengths and multiplex the add wavelengths, respectively. Irrespective of the underlying architecture, the OADMs currently in the art are characteristically high in cost, and prone to significant optical loss accumulation. Moreover, the designs of these OADMs are such that it is inherently difficult to reconfigure them in a dynamic fashion.

U.S. Pat. No. 6,204,946 of Askyuk et al. discloses an OADM that makes use of free-space optics in a parallel construction. In this case, a multi-wavelength optical signal emerging from an input port is incident onto a ruled diffraction grating. The constituent spectral channels thus separated are then focused by a focusing lens onto a linear array of binary micromachined mirrors. Each micromirror is configured to operate between two discrete states, such that it either retroreflects its corresponding spectral channel back into the input port as a pass-through channel, or directs its spectral channel to an output port as a drop channel. As such, the pass-through signal (i.e., the combined pass-through channels) shares the same input port as the input signal. An optical circulator is therefore coupled to the input port, to provide necessary routing of these two signals. Likewise, the drop channels share the output port with the add channels. An additional optical circulator is thereby coupled to the output port, from which the drop channels exit and the add channels are introduced into the output port. The add channels are subsequently combined with the pass-through signal by way of the diffraction grating and the binary micromirrors.

Although the aforementioned OADM disclosed by Askyuk et al. has the advantage of performing wavelength separating and routing in free space and thereby incurring less optical loss, it suffers a number of limitations. First, it requires that the pass-through signal share the same port/fiber as the input signal. An optical circulator therefore has to be implemented, to provide necessary routing of these two signals. Likewise, all the add and drop channels enter and leave the OADM through the same output port, hence the need for another optical circulator. Moreover, additional means must be provided to multiplex the add channels before entering the system and to demultiplex the drop channels after exiting the system. This additional multiplexing/demultiplexing requirement adds more cost and complexity that can restrict the versatility of the OADM thus-constructed. Second, the optical circulators implemented in this OADM for various routing purposes introduce additional optical losses, which can accumulate to a substantial amount. Third, the constituent optical components must be in a precise alignment, in order for the system to achieve its intended purpose. There are, however, no provisions provided for maintaining the requisite alignment; and no mechanisms implemented for overcoming degradation in the alignment owing to environmental effects such as thermal and mechanical disturbances over the course of operation.

U.S. Pat. No. 5,906,133 of Tomlinson discloses an OADM that makes use of a design similar to that of Aksyuk et al. There are input, output, drop and add ports implemented in this case. By positioning the four ports in a specific arrangement, each micromirror, which is switchable between two discrete positions, either reflects its corresponding channel (coming from the input port) to the output port, or concomitantly reflects its channel to the drop port and an incident add channel to the output port. As such, this OADM is able to perform both the add and drop functions without involving additional optical components (such as optical circulators used in the system of Aksyuk et al.). However, because a single drop port is designated for all the drop channels and a single add port is designated for all the add channels, the add channels would have to be multiplexed before entering the add port and the drop channels likewise need to be demultiplexed upon exiting from the drop port. Moreover, as in the case of Askyuk et al., there are no provisions provided for maintaining the requisite optical alignment in the system, and no mechanisms are implemented for combating degradation in the alignment due to environmental effects over the course of operation.

As such, the prevailing drawbacks suffered by the OADMs currently in the art are summarized as follows:

1) The wavelength routing is intrinsically static, rendering it difficult to dynamically reconfigure these OADMs.
2) Add and/or drop channels often need to be multiplexed and/or demultiplexed, thereby imposing additional complexity and cost.
3) Stringent fabrication tolerance and painstaking optical alignment are required. Moreover, the optical alignment is not actively maintained, rendering it susceptible to environmental effects such as thermal and mechanical disturbances over the course of operation.
4) In an optical communication network, OADMs are typically in a ring or cascaded configuration. In order to mitigate the interference amongst OADMs, which often adversely affects the overall performance of the network, it is essential that the optical power levels of spectral channels entering and exiting each OADM be managed in a systematic way, for instance, by introducing power (or gain) equalization at each stage. Such a power equalization capability is also needed for compensating for non-uniform gain caused by optical amplifiers (e.g., erbium doped fiber amplifiers) in the network. There lacks, however, a systematic and dynamic management of the optical power levels of various spectral channels in these OADMs.
5) The inherent high cost and heavy optical loss further impede the wide application of these OADMs.

In view of the foregoing, there is an urgent need in the art for optical add-drop multiplexers that overcome the aforementioned shortcomings in a simple, effective, and economical construction.

SUMMARY OF THE INVENTION

The present invention provides a wavelength-separating-routing (WSR) apparatus and method which employ an input port and a plurality of output ports; a wavelength-separator; a beam-focuser; and an array of channel micromirrors.

In operation, a multi-wavelength optical signal emerges from the input port. The wavelength-separator separates the multi-wavelength optical signal into multiple spectral channels, each characterized by a distinct center wavelength and associated bandwidth. The beam-focuser focuses the spectral channels into corresponding spectral spots. The channel micromirrors are positioned such that each channel micromirror receives one of the spectral channels. The channel micromirrors are individually controllable and movable, e.g., continuously pivotable (or rotatable), so as to reflect the spectral channels into selected ones of the output ports. As such, each channel micromirror is assigned to a specific spectral channel, hence the name "channel micromirror". And each output port may receive any number of the reflected spectral channels.

A distinct feature of the channel micromirrors in the present invention, in contrast to those used in the prior art, is that the motion, e.g., pivoting (or rotation), of each channel micromirror is under analog control such that its pivoting angle can be continuously adjusted. This enables each channel micromirror to scan its corresponding spectral channel across all possible output ports and thereby direct the spectral channel to any desired output port.

In the WSR apparatus of the present invention, the wavelength-separator may be provided by a ruled diffraction grating, a holographic diffraction grating, an echelle grating, a curved diffraction grating, a dispersing prism; or other wavelength-separating means known in the art. The beam-focuser may be a single lens, an assembly of lenses, or other beam-focusing means known in the art. The channel micromirrors may be provided by silicon micromachined mirrors, reflective ribbons (or membranes), or other types of beam-deflecting means known in the art. And each channel micromirror may be pivotable about one or two axes. The input and output ports may be provided by fiber collimators, e.g., arranged in a one-dimensional or two-dimensional array. In the latter case, the channel micromirrors must be pivotable biaxially.

The WSR apparatus of the present invention may further comprise an array of collimator-alignment mirrors, in optical communication with the wavelength-separator and the fiber collimators, for adjusting the alignment of the input multi-wavelength signal and directing the spectral channels into the selected output ports by way of angular control of the collimated beams. Each collimator-alignment mirror may be rotatable about one or two axes. The collimator-alignment mirrors may be arranged in a one-dimensional or two-dimensional array. First and second arrays of imaging lenses may additionally be optically interposed between the collimator-alignment mirrors and the fiber collimators in a telecentric arrangement, thereby "imaging" the collimator-alignment mirrors onto the corresponding fiber collimators to ensure an optimal alignment.

The WSR apparatus of the present invention may further include a servo-control assembly, in communication with the channel micromirrors and the output ports. The servo-control assembly serves to monitor the optical power levels of the spectral channels coupled into the output ports and further provide control of the channel micromirrors on an individual basis, so as to maintain a predetermined coupling efficiency of each spectral channel into one of the output ports. As such, the servo-control assembly provides dynamic control of the coupling of the spectral channels into the respective output ports and actively manages the optical power levels of the spectral channels coupled into the output ports. (If the WSR apparatus includes an array of collimator-alignment mirrors as described above, the servo-control assembly may additionally provide dynamic control of the collimator-alignment mirrors.) Moreover, the utilization of such a servo-control assembly effectively relaxes the requisite fabrication tolerances and the precision of optical alignment during assembly of a WSR apparatus of the present invention, and further enables the system to correct for shift in optical alignment over the course of operation. A WSR apparatus incorporating a servo-control assembly thus described is termed a WSR-S apparatus, thereinafter in the present invention.

As such, the aforementioned WSR (or WSR-S) apparatus of the present invention may be used as a "reconfigurable optical drop module" (RODM) that is capable of dynamically routing any wavelength in the input multi-wavelength optical signal to any one of the output ports. Further, by operating an RODM in reverse (e.g., the output ports serving as multiple input ports and the input port providing for an output port), the RODM can also combine (or "add") multiple input optical signals from the input ports and direct the combined optical signal to the output port, hence providing for a "reconfigurable optical add module" (ROAM). The input optical signals to an ROAM may each contain one or more wavelengths (or spectral channels).

The RODMs and ROAMs of the present invention may be utilized as building blocks for constructing a variety of optical networking systems, such as reconfigurable optical add-drop multiplexers (OADMs).

In an exemplary embodiment of an OADM of the present invention, a first WSR-S (or WSR) apparatus is cascaded with a second WSR-S (or WSR) apparatus. The output ports of the first WSR-S (or WSR) apparatus include a pass-through port and one or more drop ports. The second WSR-S (or WSR) apparatus includes a plurality of input ports and an exiting port. The configuration is such that the pass-through channels from the first WSR-S apparatus and one or more add channels are directed into the input ports of the second WSR-S apparatus, and consequently multiplexed into an output multi-wavelength optical signal directed into the exiting port of the second WSR-S apparatus. That is, in this embodiment, one WSR-S apparatus (e.g., the first one) serves as an RODM, effective to perform dynamic drop function. The other WSR-S apparatus (e.g., the second one) functions as an ROAM, providing dynamic add function. There are essentially no fundamental restrictions on the wavelengths that can be added or dropped, other than those imposed by the overall communication system.

Those skilled in the art will recognize that the aforementioned embodiments provide only two of many embodiments of a dynamically reconfigurable OADM according to the present invention. Various changes, substitutions, and alternations can be made herein, without departing from the principles and the scope of the invention. Accordingly, a skilled artisan can design an OADM in accordance with the present invention, to best suit a given application.

The OADMs of the present invention provide many advantages over the prior art devices, notably:

1) By advantageously employing an array of channel micromirrors that are individually and continuously controllable, an OADM of the present invention is capable of routing the spectral channels on a channel-by-channel basis and directing any spectral channel into any one of the output ports. As such, its underlying operation is dynamically reconfigurable, and its underlying architecture is intrinsically scalable to a large number of channel and port counts.

2) The add and drop spectral channels need not be multiplexed and demultiplexed before entering and after leaving the OADM respectively. And there are not fundamental restrictions on the wavelengths to be added or dropped.

3) The coupling of the spectral channels into the output ports is dynamically controlled by a servo-control assembly, rendering the OADM less susceptible to environmental effects (such as thermal and mechanical disturbances) and therefore more robust in performance. By maintaining an optimal optical alignment, the optical losses incurred by the spectral channels are also significantly reduced.

4) The optical power levels of the spectral channels coupled into the output ports can be dynamically managed according to demand, or maintained at desired values (e.g., equalized at a predetermined value) by way of the servo-control assembly. This spectral power-management capability as an integral part of the OADM will be particularly desirable in WDM optical networking applications.

5) The use of free-space optics provides a simple, low loss, and cost-effective construction. Moreover, the utilization of the servo-control assembly effectively relaxes the requisite fabrication tolerances and the precision of optical alignment during initial assembly, enabling the OADM to be simpler and more adaptable in structure, and lower in cost and optical loss.

6) The underlying OADM architecture allows a multiplicity of the OADMs according to the present invention to be readily assembled (e.g., cascaded) for WDM optical networking applications.

The novel features of this invention, as well as the invention itself, will be best understood from the following drawings and detailed description.

DETAILED DESCRIPTION

In this specification and appending claims, a "spectral channel" is characterized by a distinct center wavelength and associated bandwidth. Each spectral channel may carry a unique information signal, as in WDM optical networking applications.

Figure 1A:
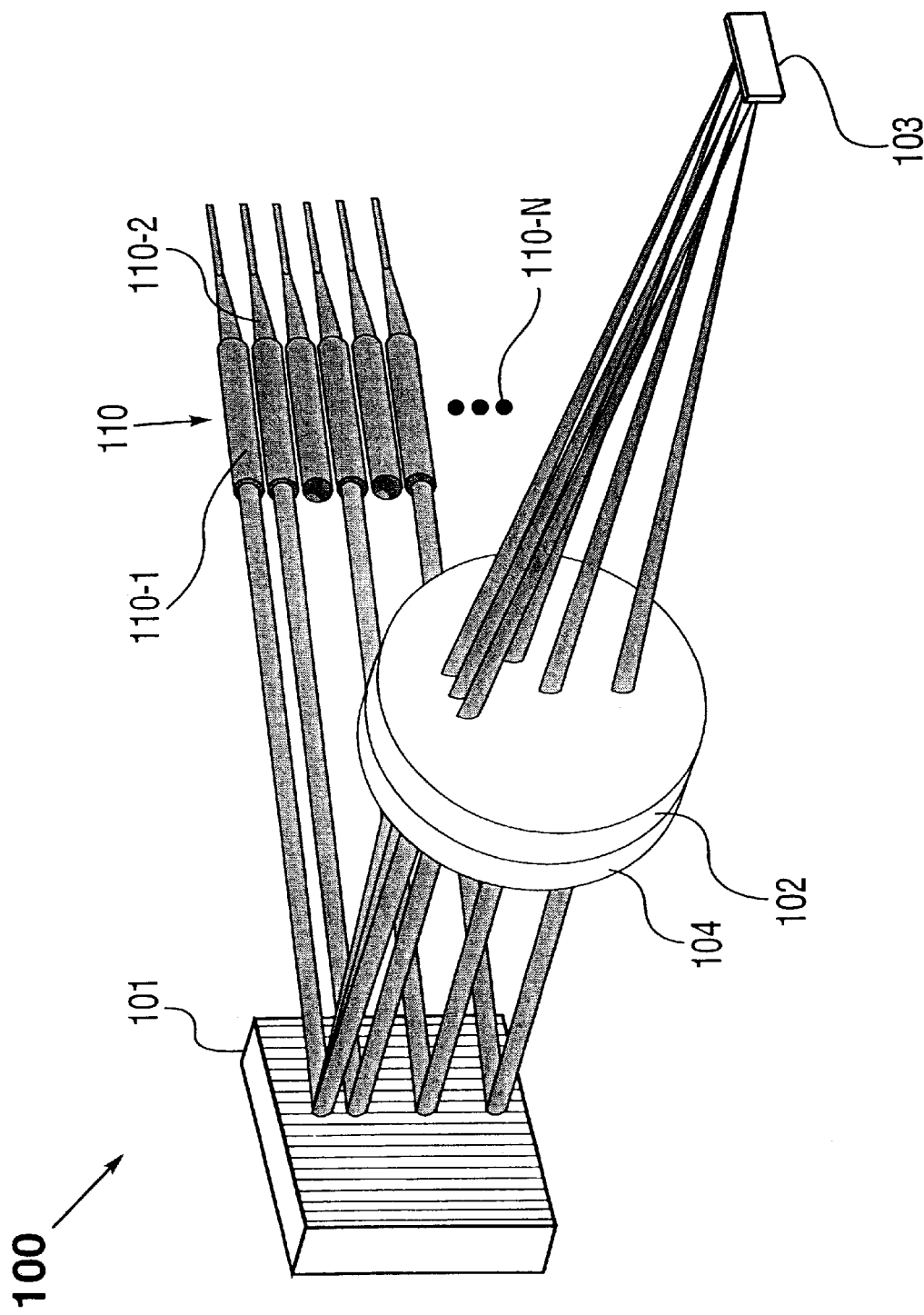
FIGS. 1A–1D show a first embodiment of a wavelength-separating-routing (WSR) apparatus according to the present invention, and the modeling results demonstrating the performance of the WSR apparatus.

FIG. 1A depicts a first embodiment of a wavelength-separating-routing (WSR) apparatus according to the present invention. By way of example to illustrate the general principles and the topological structure of a wavelength-separating-routing (WSR) apparatus of the present invention, the WSR apparatus 100 comprises multiple input/output ports which may be in the form of an array of fiber collimators 110, providing an input port 110-1 and a plurality of output ports 110-2 through 110-N (N≧3); a wavelength-separator which in one form may be a diffraction grating 101; a beam-focuser in the form of a focusing lens 102; and an array of channel micromirrors 103.

In operation, a multi-wavelength optical signal emerges from the input port 110-1. The diffraction grating 101 angularly separates the multi-wavelength optical signal into multiple spectral channels, which are in turn focused by the focusing lens 102 into a spatial array of distinct spectral spots (not shown in FIG. 1A) in a one-to-one correspondence. The channel micromirrors 103 are positioned in accordance with the spatial array formed by the spectral spots, such that each channel micromirror receives one of the spectral channels. The channel micromirrors 103 are individually controllable and movable, e.g., pivotable (or rotatable) under analog (or continuous) control, such that, upon reflection, the spectral channels are directed into selected ones of the output ports 110-2 through 110-N by way of the focusing lens 102 and the diffraction grating 101. As such, each channel micromirror is assigned to a specific spectral channel, hence the name "channel micromirror". Each output port may receive any number of the reflected spectral channels.

For purposes of illustration and clarity, only a selective few (e.g., three) of the spectral channels, along with the input multi-wavelength optical signal, are graphically illustrated in FIG. 1A and the following figures. It should be noted, however, that there can be any number of the spectral channels in a WSR apparatus of the present invention (so long as the number of spectral channels does not exceed the number of channel mirrors employed in the system). It should also be noted that the optical beams representing the spectral channels shown in FIG. 1A and the following figures are provided for illustrative purpose only. That is, their sizes and shapes may not be drawn according to scale. For instance, the input beam and the corresponding diffracted beams generally have different cross-sectional shapes, so long as the angle of incidence upon the diffraction grating is not equal to the angle of diffraction, as is known to those skilled in the art.

In the embodiment of FIG. 1A, it is preferable that the diffraction grating 101 and the channel micromirrors 103 are placed respectively at the first and second (i.e., the front and back) focal points (on the opposing sides) of the focusing lens 102. Such a telecentric arrangement allows the chief rays of the focused beams to be parallel to each other and generally parallel to the optical axis. In this application, the telecentric configuration further allows the reflected spectral channels to be efficiently coupled into the respective output ports, thereby minimizing various translational walk-off effects that may otherwise arise. Moreover, the input multi-wavelength optical signal is preferably collimated and circular in cross-section. The corresponding spectral channels diffracted from the diffraction grating 101 are generally elliptical in cross-section; they may be of the same size as the input beam in one dimension and elongated in the other dimension.

It is known that the diffraction efficiency of a diffraction grating is generally polarization-dependent. That is, the diffraction efficiency of a grating in a standard mounting configuration may be considerably higher for P-polarization that is perpendicular to the groove lines on the grating than for S-polarization that is orthogonal to P-polarization, especially as the number of groove lines (per unit length) increases. To mitigate such polarization-sensitive effects, a quarter-wave plate 104 may be optically interposed between the diffraction grating 101 and the channel micromirrors 103, and preferably placed between the diffraction grating 101 and the focusing lens 102 as is shown in FIG. 1A. In this way, each spectral channel experiences a total of approximately 90-degree rotation in polarization upon traversing the quarter-wave plate 104 twice. (That is, if a beam of light has P-polarization when first encountering the diffraction grating, it would have predominantly (if not all) S-polarization upon the second encountering, and vice versa.) This ensures that all the spectral channels incur nearly the same amount of round-trip polarization dependent loss.

Figure 1B:
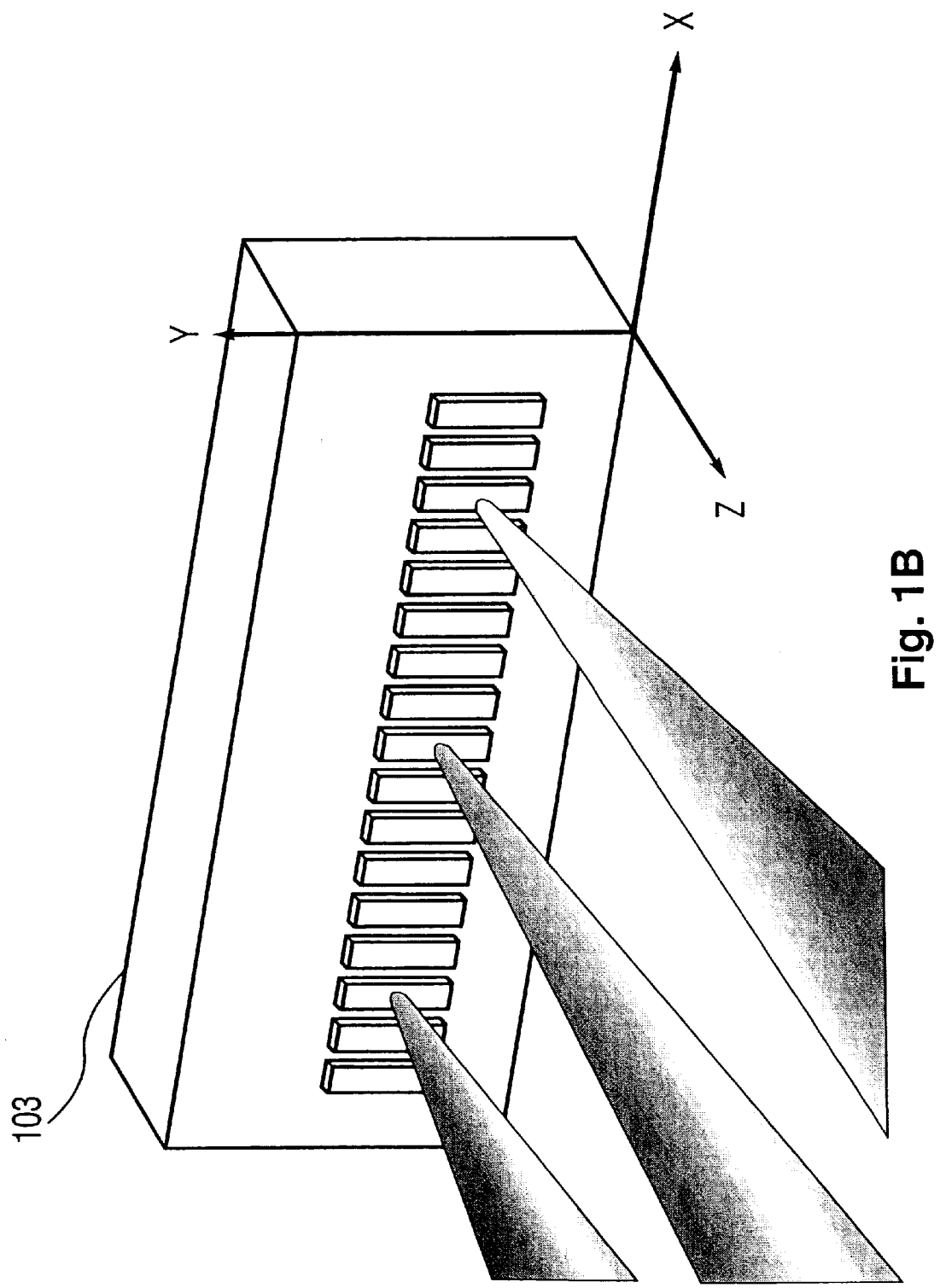

In the WSR apparatus 100 of FIG. 1A, the diffraction grating 101, by way of example, is oriented such that the focused spots of the spectral channels fall onto the channel micromirrors 103 in a horizontal array, as illustrated in FIG. 1B.

Depicted in FIG. 1B is a close-up view of the channel micromirrors 103 shown in the embodiment of FIG. 1A. By way of example, the channel micromirrors 103 are arranged in a one-dimensional array along the x-axis (i.e., the horizontal direction in the figure), so as to receive the focused spots of the spatially separated spectral channels in a one-to-one correspondence. (As in the case of FIG. 1A, only three spectral channels are illustrated, each represented by a converging beam.) Let the reflective surface of each channel micromirror lie in the x-y plane as defined in the figure and be movable, e.g., pivotable (or deflectable) about the x-axis in an analog (or continuous) manner. Each spectral channel, upon reflection, is deflected in the y-direction (e.g., downward) relative to its incident direction, so as to be directed into one of the output ports 110-2 through 110-N shown in FIG. 1A.

Figure 1C:
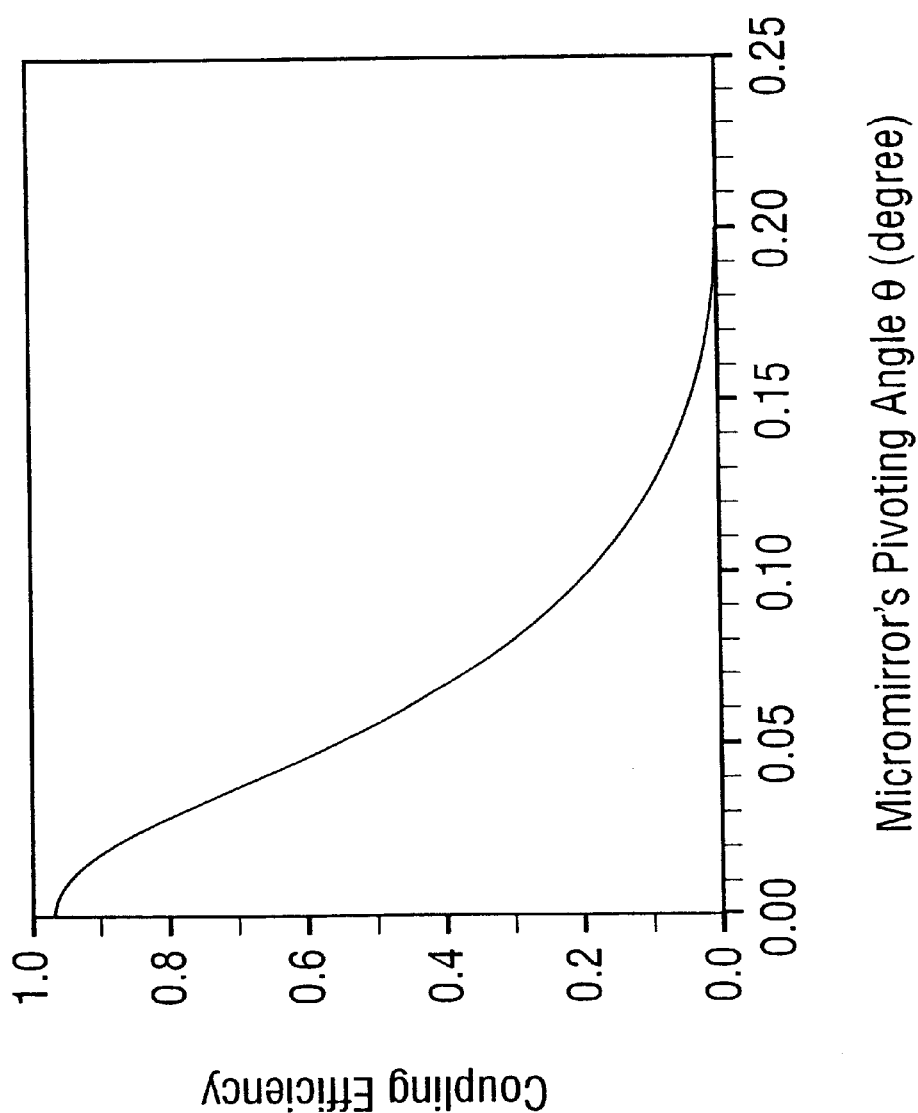
Figure 1D:
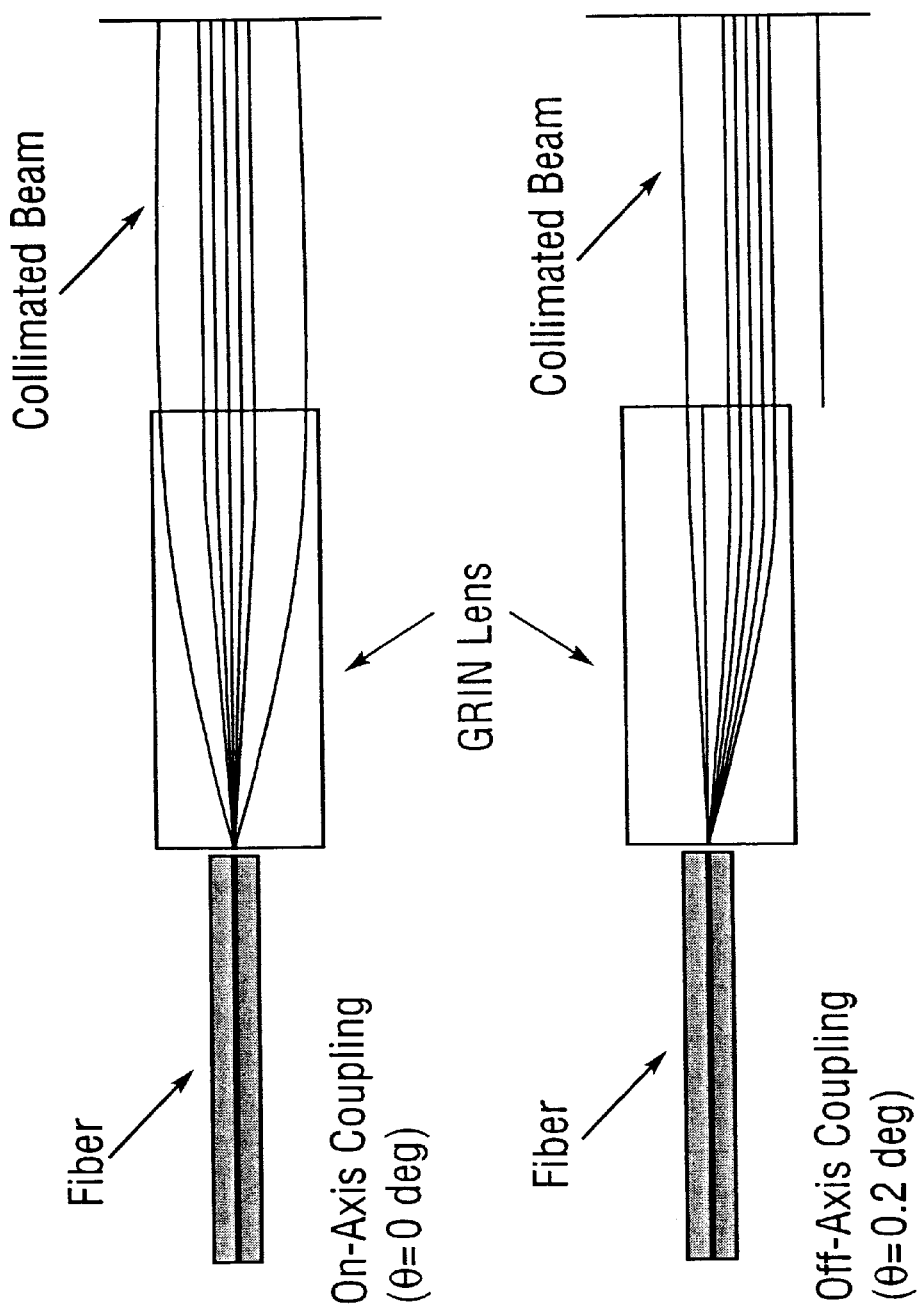

As described above, a unique feature of the present invention is that the motion of each channel micromirror is individually and continuously controllable, such that its position, e.g., pivoting angle, can be continuously adjusted. This enables each channel micromirror to scan its corresponding spectral channel across all possible output ports and thereby direct the spectral channel to any desired output port. To illustrate this capability, FIG. 1C shows a plot of coupling efficiency as a function of a channel micromirror's pivoting angle $\theta$, provided by a ray-tracing model of a WSR apparatus in the embodiment of FIG. 1A. As used herein, the coupling efficiency for a spectral channel is defined as the ratio of the amount of optical power coupled into the fiber core in an output port to the total amount of optical power incident upon the entrance surface of the fiber (associated with the fiber collimator serving as the output port). In the ray-tracing model, the input optical signal is incident upon a diffraction grating with 700 lines per millimeter at a grazing angle of 85 degrees, where the grating is blazed to optimize the diffraction efficiency for the "−1" order. The focusing lens has a focal length of 100 mm. Each output port is provided by a quarter-pitch GRIN lens (2 mm in diameter) coupled to an optical fiber (see FIG. 1D). As displayed in FIG. 1C, the coupling efficiency varies with the pivoting angle $\theta$, and it requires about a 0.2-degree change in $\theta$ for the coupling efficiency to become practically negligible in this exemplary case. As such, each spectral channel may practically acquire any coupling efficiency value by way of controlling the pivoting angle of its corresponding channel micromirror. This is also to say that variable optical attenuation at the granularity of a single wavelength can be obtained in a WSR apparatus of the present invention. FIG. 1D provides ray-tracing illustrations of two extreme points on the coupling efficiency vs. $\theta$ curve of FIG. 1C: on-axis coupling corresponding to $\theta=0$, where the coupling efficiency is maximum; and off-axis coupling corresponding to $\theta=0.2$ degrees, where the representative collimated beam (representing an exemplary spectral channel) undergoes a significant translational walk-off and renders the coupling efficiency practically negligible. The exemplary modeling results thus described demonstrate the unique capabilities of the WSR apparatus of the present invention.

FIG. 1A provides one of many embodiments of a WSR apparatus according to the present invention. In general, the wavelength-separator is a wavelength-separating means that may be a ruled diffraction grating, a holographic diffraction grating, an echelle grating, a dispersing prism, or other types of spectral-separating means known in the art. The beam-focuser may be a focusing lens, an assembly of lenses, or other beam-focusing means known in the art. The focusing function may also be accomplished by using a curved diffraction grating as the wavelength-separator. The channel micromirrors may be provided by silicon micromachined mirrors, reflective ribbons (or membranes), or other types of beam-deflecting elements known in the art. Each micromirror may be pivoted about one or two axes. It is important that the pivoting (or rotational) motion of each channel micromirror be individually controllable in an analog manner, whereby the pivoting angle can be continuously adjusted so as to enable the channel micromirror to scan a spectral channel across all possible output ports. The underlying fabrication techniques for micromachined mirrors and associated actuation mechanisms are well documented in the art, see U.S. Pat. No. 5,629,790 for example. Moreover, a fiber collimator is typically in the form of a collimating lens (such as a GRIN lens) and a ferrule-mounted fiber packaged together in a mechanically rigid stainless steel (or glass) tube. The fiber collimators serving as the input and output ports may be arranged in a one-dimensional array, a two-dimensional array, or other desired spatial pattern. For instance, they may be conveniently mounted in a linear array along a V-groove fabricated on a substrate made of silicon, plastic, or ceramic, as commonly practiced in the art. It should be noted, however, that the input port and the output ports need not necessarily be in close spatial proximity with each other, such as in an array configuration (although a close packing would reduce the rotational range required for each channel micromirror). Those skilled in the art will know how to design a WSR apparatus according to the present invention, to best suit a given application.

Figure 2A:
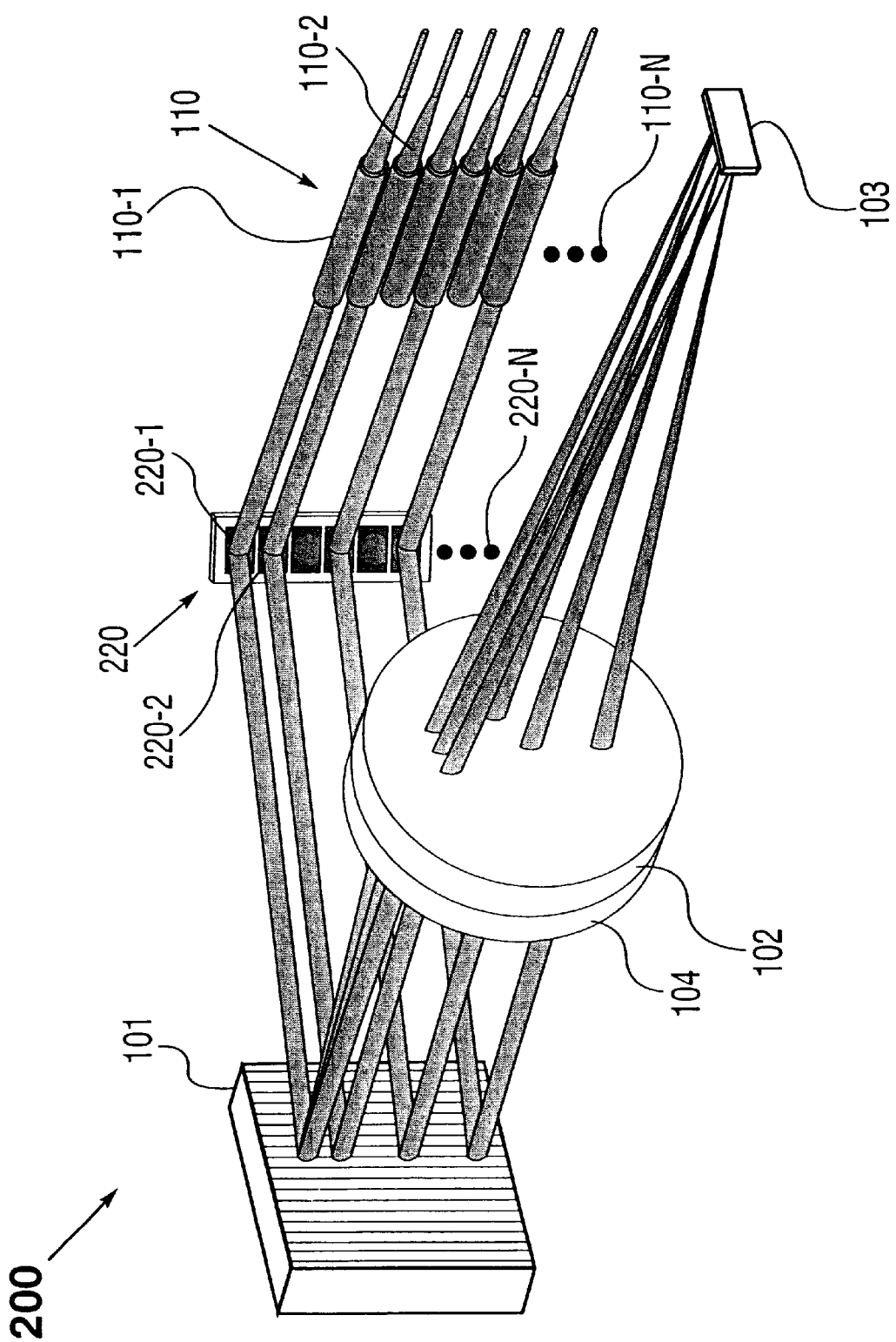
FIGS. 2A–2C depict second and third embodiments of a WSR apparatus according to the present invention.
Figure 2B:
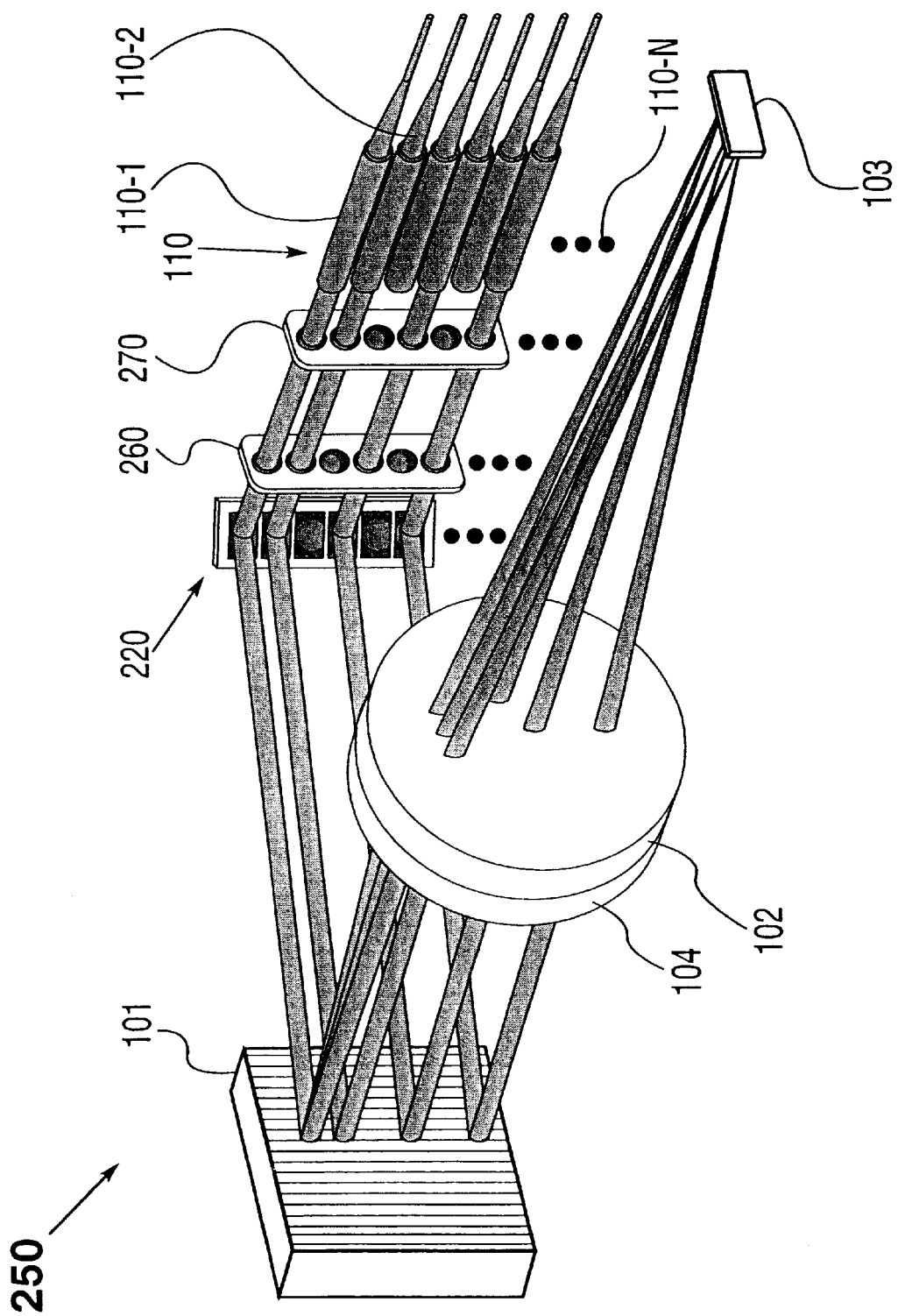
Figure 3:
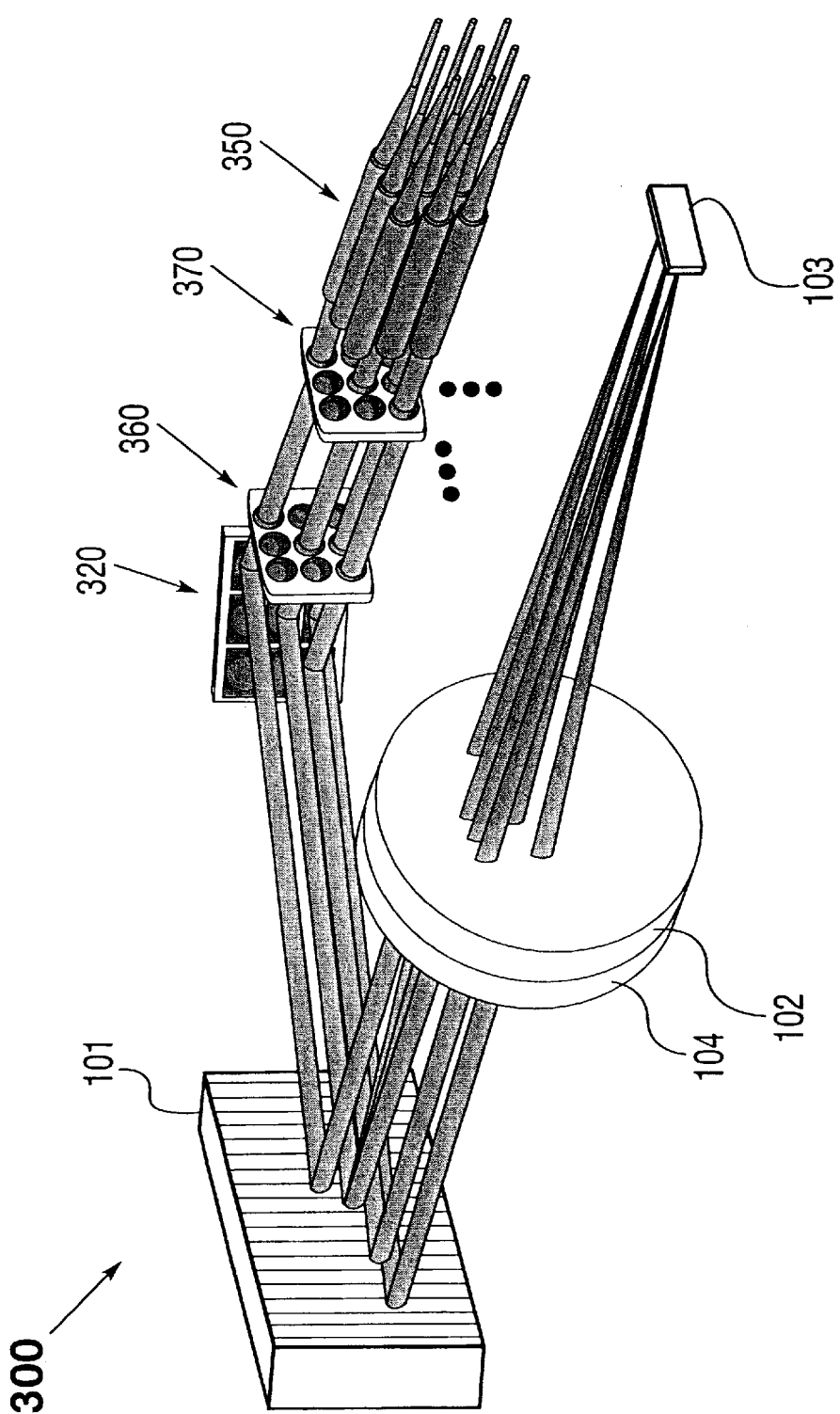
FIG. 3 shows a fourth embodiment of a WSR apparatus according to the present invention.

A WSR apparatus of the present invention may further comprise an array of collimator-alignment mirrors, for adjusting the alignment of the input multi-wavelength optical signal and facilitating the coupling of the spectral channels into the respective output ports, as shown in FIGS. 2A–2B and 3.

FIG. 2A depicts a second embodiment of a WSR apparatus according to the present invention. By way of example, WSR apparatus 200 is built upon and hence shares a number of the elements used in the embodiment of FIG. 1A, as identified by those labeled with identical numerals. Moreover, a one-dimensional array 220 of collimator-alignment mirrors 220-1 through 220-N is optically interposed between the diffraction grating 101 and the fiber collimator array 110. The collimator-alignment mirror 220-1 is designated to correspond with the input port 110-1, for adjusting the alignment of the input multi-wavelength optical signal and therefore ensuring that the spectral channels impinge onto the corresponding channel micromirrors. The collimator-alignment mirrors 220-2 through 220-N are designated to the output ports 110-2 through 110-N in a one-to-one correspondence, serving to provide angular control of the collimated beams of the reflected spectral channels and thereby facilitating the coupling of the spectral channels into the respective output ports according to desired coupling efficiencies. Each collimator-alignment mirror may be rotatable about one axis, or two axes.

Figure 2C:
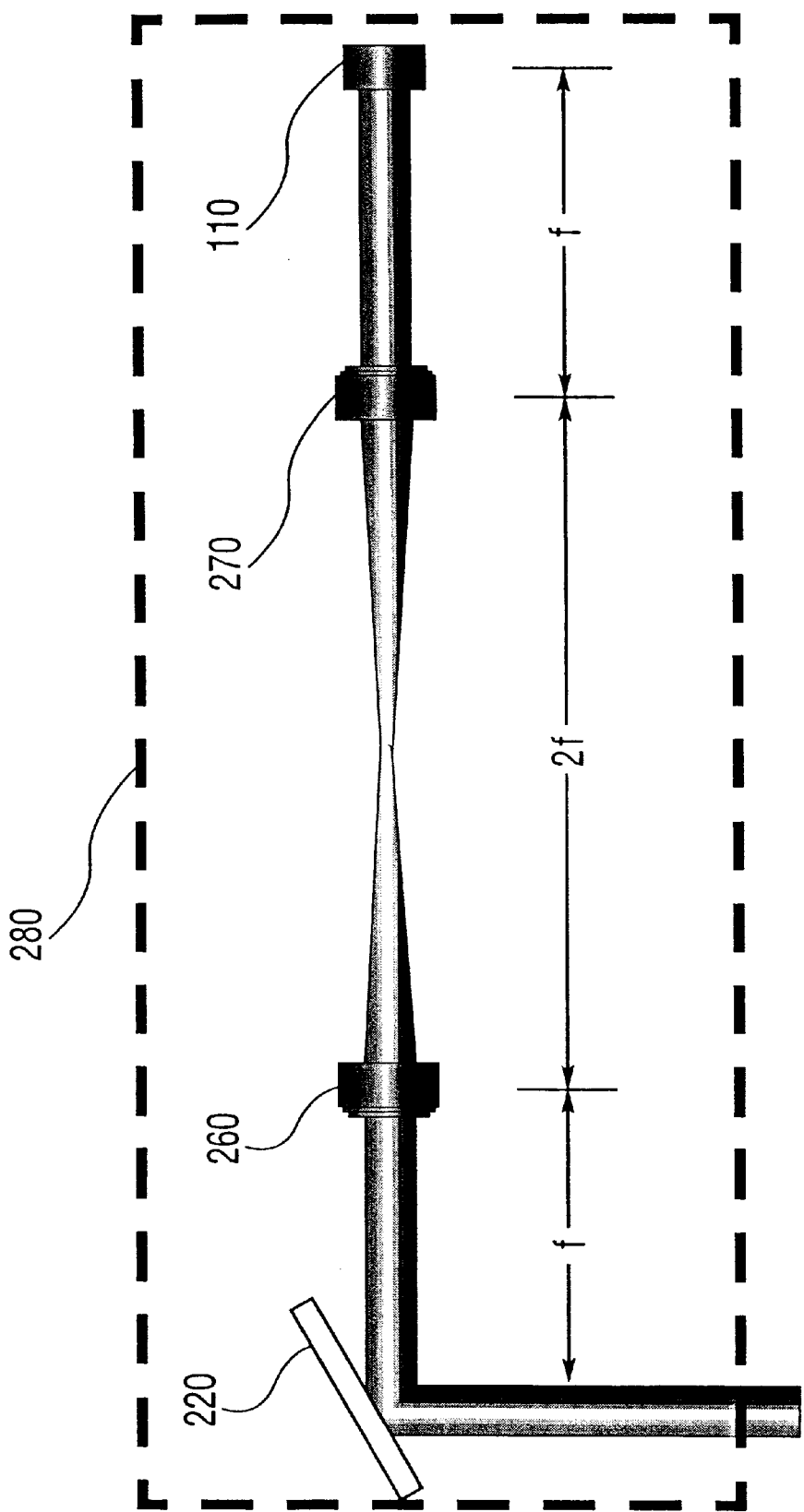

The embodiment of FIG. 2A is attractive in applications where the fiber collimators (serving as the input and output ports) are desired to be placed in close proximity to the collimator-alignment mirror array 220. To best facilitate the coupling of the spectral channels into the output ports, arrays of imaging lenses may be implemented between the collimator-alignment mirror array 220 and the fiber collimator array 110, as depicted in FIG. 2B. By way of example, WSR apparatus 250 of FIG. 2B is built upon and hence shares many of the elements used in the embodiment of FIG. 2A, as identified by those elements labeled with identical numerals. Additionally, first and second arrays 260, 270 of imaging lenses are placed in a 4-f telecentric arrangement with respect to the collimator-alignment mirror array 220 and the fiber collimator array 110. The dashed box 280 shown in FIG. 2C provides a top view of such a telecentric arrangement. In this case, the imaging lenses in the first and second arrays 260, 270 all have the same focal length f. The collimator-alignment mirrors 220-1 through 220-N are placed at the respective first (or front) focal points of the imaging lenses in the first array 260. Likewise, the fiber collimators 110-1 through 110-N are placed at the respective second (or back) focal points of the imaging lenses in the second array 270. And the separation between the first and second arrays 260, 270 of imaging lenses is 2f. In this way, the collimator-alignment mirrors 220-1 through 220-N are effectively imaged onto the respective entrance surfaces (i.e., the front focal planes) of the GRIN lenses in the corresponding fiber collimators 110-1 through 110-N. Such a telecentric imaging system substantially eliminates translational walk-off of the collimated beams at the output ports that may otherwise occur as the mirror angles change.

FIG. 3 shows a fourth embodiment of a WSR apparatus according to the present invention. By way of example, WSR apparatus 300 is built upon and hence shares a number of the elements used in the embodiment of FIG. 2B, as identified by those labeled with identical numerals. In this case, the one-dimensional fiber collimator array 110 of FIG. 2B is replaced by a two-dimensional array 350 of fiber collimators, providing for an input-port and a plurality of output ports. Accordingly, the one-dimensional collimator-alignment mirror array 220 of FIG. 2B is replaced by a two-dimensional array 320 of collimator-alignment mirrors, and first and second one-dimensional arrays 260, 270 of imaging lenses of FIG. 2B are likewise replaced by first and second two-dimensional arrays 360, 370 of imaging lenses respectively. As in the case of the embodiment of FIG. 2B, the first and second two-dimensional arrays 360, 370 of imaging lenses are placed in a 4-f telecentric arrangement with respect to the two-dimensional collimator-alignment mirror array 320 and the two-dimensional fiber collimator array 350. Each of the channel micromirrors 103 must be pivotable biaxially in this case (in order to direct its corresponding spectral channel to any one of the output ports). As such, the WSR apparatus 300 is equipped to support a greater number of the output ports.

In addition to facilitating the coupling of the spectral channels into the respective output ports as described above, the collimator-alignment mirrors in the above embodiments also serve to compensate for misalignment (e.g., due to fabrication and assembly errors) in the fiber collimators that provide for the input and output ports. For instance, relative misalignment between the fiber cores and their respective collimating lenses in the fiber collimators can lead to pointing errors in the collimated beams, which may be corrected for by the collimator-alignment mirrors. For these reasons, the collimator-alignment mirrors are preferably rotatable about two axes. They may be silicon micromachined mirrors, for fast rotational speeds. They may also be other types of mirrors or beam-deflecting elements known in the art.

To optimize the coupling of the spectral channels into the output ports and further maintain the optimal optical alignment against environmental effects such as temperature variations and mechanical instabilities over the course of operation, a WSR apparatus of the present invention may incorporate a servo-control assembly, for providing dynamic control of the coupling of the spectral channels into the respective output ports on a channel-by-channel basis. A WSR apparatus incorporating a servo-control assembly is termed a WSR-S apparatus, thereinafter in this specification.

Figure 4A:
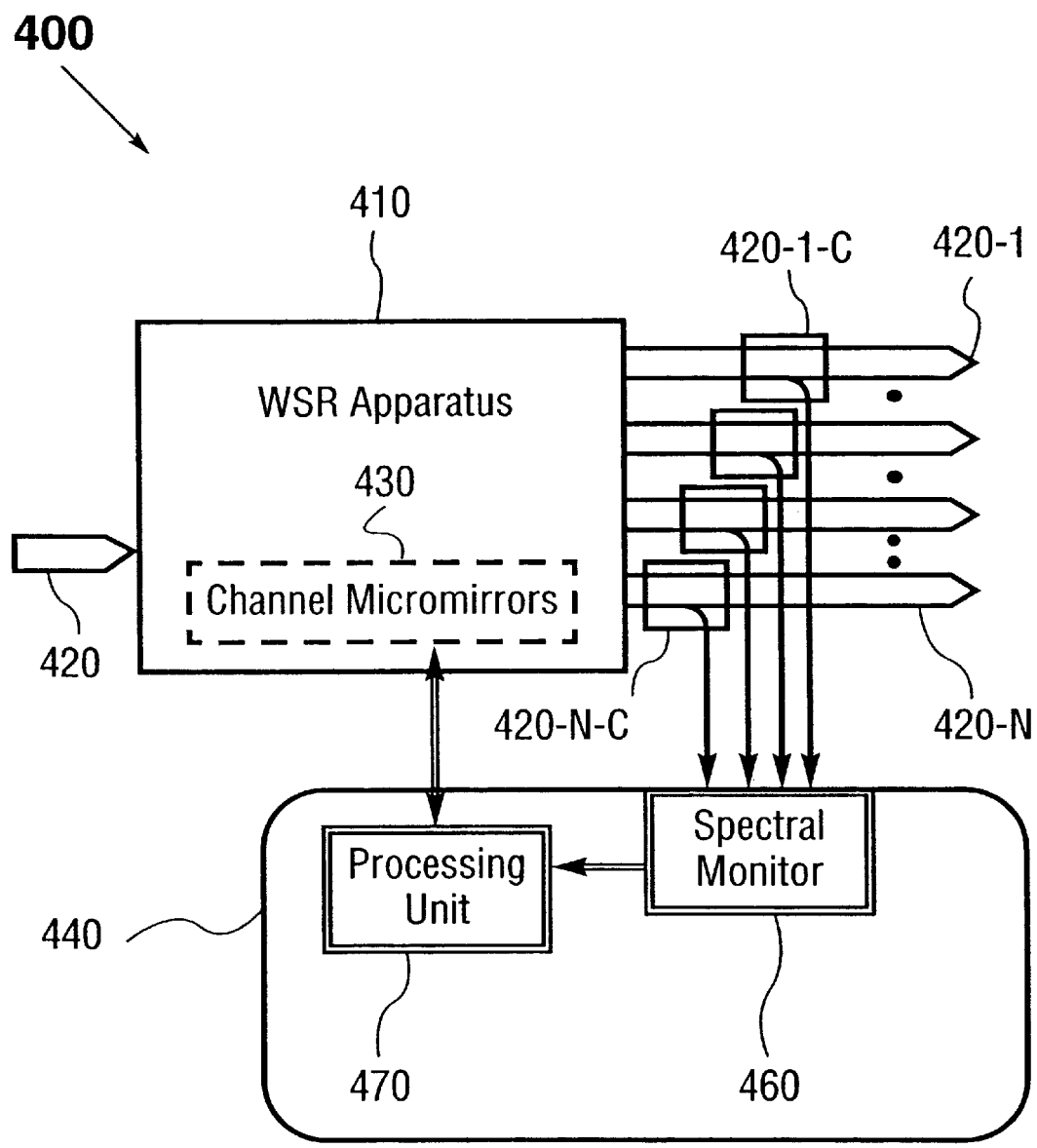
FIGS. 4A–4B show schematic illustrations of two embodiments of a WSR-S apparatus comprising a WSR apparatus and a servo-control assembly, according to the present invention.

FIG. 4A depicts a schematic illustration of a first embodiment of a WSR-S apparatus according to the present invention. The WSR-S apparatus 400 comprises a WSR apparatus 410 and a servo-control assembly 440. The WSR 410 may make use of the embodiment of FIG. 1A, or any other embodiment in accordance with the present invention. The servo-control assembly 440 may include a spectral monitor 460, for monitoring the optical power levels of the spectral channels coupled into the output ports 420-1 through 420-N of the WSR apparatus 410. By way of example, the spectral monitor 460 is coupled to the output ports 420-1 through 420-N by way of fiber-optic couplers 420-1-C through 420-N-C, wherein each fiber-optic coupler serves to "tap off" a predetermined fraction of the optical signal in the corresponding output port. The servo-control assembly 440 further includes a processing unit 470, in communication with the spectral monitor 460 and the channel micromirrors 430 of the WSR apparatus 410. The processing unit 470 uses the optical power measurements from the spectral monitor 460 to provide feedback control of the channel micromirrors 430 on an individual basis, so as to maintain a desired coupling efficiency for each spectral channel into a selected output port. As such, the servo-control assembly 440 provides dynamic control of the coupling of the spectral channels into the respective output ports on a channel-by-channel basis and thereby manages the optical power levels of the spectral channels coupled into the output ports. The optical power levels of the spectral channels in the output ports may be dynamically managed according to demand, or maintained at desired values (e.g., equalized at a predetermined value) in the present invention. Such a spectral power-management capability is essential in WDM optical networking applications, as discussed above.

Figure 4B:
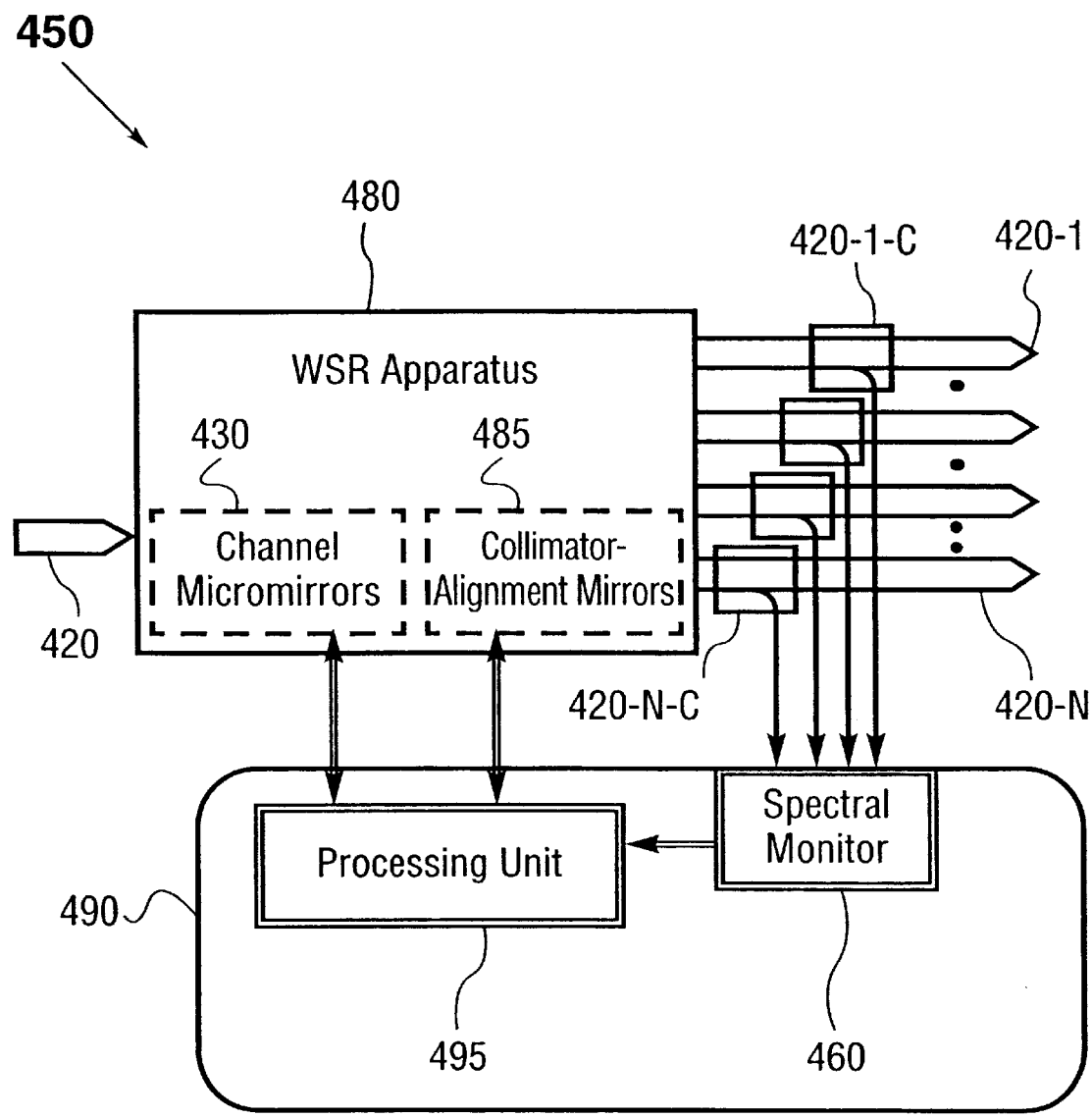

FIG. 4B depicts a schematic illustration of a second embodiment of a WSR-S apparatus according to the present invention. The WSR-S apparatus 450 comprises a WSR apparatus 480 and a servo-control assembly 490. In addition to the channel micromirrors 430 (and other elements identified by the same numerals as those used in FIG. 4A), the WSR apparatus 480 may further include a plurality of collimator-alignment mirrors 485, and may be configured according to the embodiment of FIGS. 2A, 2B, 3, or any other embodiment in accordance with the present invention. By way of example, the servo-control assembly 490 may include the spectral monitor 460 as described in the embodiment of FIG. 4A, and a processing unit 495. In this case, the processing unit 495 is in communication with the channel micromirrors 430 and the collimator-alignment mirrors 485 of the WSR apparatus 480, as well as the spectral monitor 460. The processing unit 495 uses the optical power measurements from the spectral monitor 460 to provide dynamic control of the channel micromirrors 430 along with the collimator-alignment mirrors 485, so as to maintain the coupling efficiencies of the spectral channels into the output ports at desired values.

In the embodiment of FIG. 4A or 4B, the spectral monitor 460 may be one of spectral power monitoring devices known in the art that is capable of detecting the optical power levels of spectral components in a multi-wavelength optical signal. Such devices are typically in the form of a wavelength-separating means (e.g., a diffraction grating) that spatially separates a multi-wavelength optical signal by wavelength into constituent spectral components, and one or more optical sensors (e.g., an array of photodiodes) that are configured such to detect the optical power levels of these spectral components. The processing unit 470 in FIG. 4A (or the processing unit 495 in FIG. 4B) typically includes electrical circuits and signal processing programs for processing the optical power measurements provided by the spectral monitor 460 and generating appropriate control signals to be applied to the channel micromirrors 430 (and the collimator-alignment mirrors 485 in the case of FIG. 4B), so as to maintain the coupling efficiencies of the spectral channels into the output ports at desired values. The electronic circuitry and the associated signal processing algorithm/software for such a processing unit in a servo-control system are known in the art. From the teachings of the present invention, a skilled artisan will know how to implement a suitable spectral monitor along with an appropriate processing unit to provide a servo-control assembly in a WSR-S apparatus of the present invention, for a given application.

The incorporation of a servo-control assembly provides additional advantages of effectively relaxing the requisite fabrication tolerances and the precision of optical alignment during initial assembly of a WSR apparatus of the present invention, and further enabling the system to correct for shift in the alignment (e.g., due to environmental effects) over the course of operation. By maintaining an optimal optical alignment, the optical losses incurred by the spectral channels are also significantly reduced. As such, the WSR-S apparatus thus constructed is simpler and more adaptable in structure, more robust in performance, and lower in cost and optical loss. Accordingly, the WSR-S (or WSR) apparatus of the present invention may be used to construct a variety of optical devices and utilized in many applications.

For instance, the aforementioned WSR (or WSR-S) apparatus of the present invention may be used as a "reconfigurable optical drop module" (RODM) that is capable of dynamically routing any wavelength in the input multi-wavelength optical signal to any one of the output ports. Those skilled in the art will further appreciate that by operating an RODM in reverse (e.g., the output ports 110-2 through 110-N serving as multiple input ports and the input port 110-1 as an output port in the embodiment of FIG. 1A, 2A or 2B), the RODM can also combine (or "add") multiple input optical signals from the input ports 110-2 through 110-N and direct the combined optical signal to the output port 110-1, hence providing for a "reconfigurable optical add module" (ROAM), as FIG. 5 further describes. The input optical signals to an ROAM may each contain one or more wavelengths (or spectral channels). (An ROAM may likewise be provided by operating the embodiment of FIG. 3 in reverse.)

A notable advantage of an ROAM of the present invention is that a spectral channel from any one of the input ports can be directed to the output port by way of the pivoting motion of its corresponding channel micromirror. This is in sharp contrast with a conventional wavelength multiplexer known in the art where there is a one-to-one static mapping between the incoming wavelength channels and input ports/fibers. It may generally be desirable that the input optical signals to an ROAM not contain common wavelengths, whereby each channel micromirror receives a single spectral channel (originating from one of the input ports). In the event that there are common wavelengths in the input optical signals, a channel micromirror may receive a plurality of spectral channels (originating from different input ports) and selectively direct the impinging spectral channels into the output port by way of its pivoting position. (One skilled in the art will appreciate that care may be taken in this case to avoid inadvertently coupling the "unwanted" spectral channels into the input ports.) A further inherent advantage of an ROAM (or RODM) of the present invention is that it effectively "filters out" broadband noise (e.g., amplified spontaneous emission (ASE) noise characteristic of semiconductor diode lasers) that is anywhere but in the passbands of the optical signals coupled into the output port.

Figure 5:
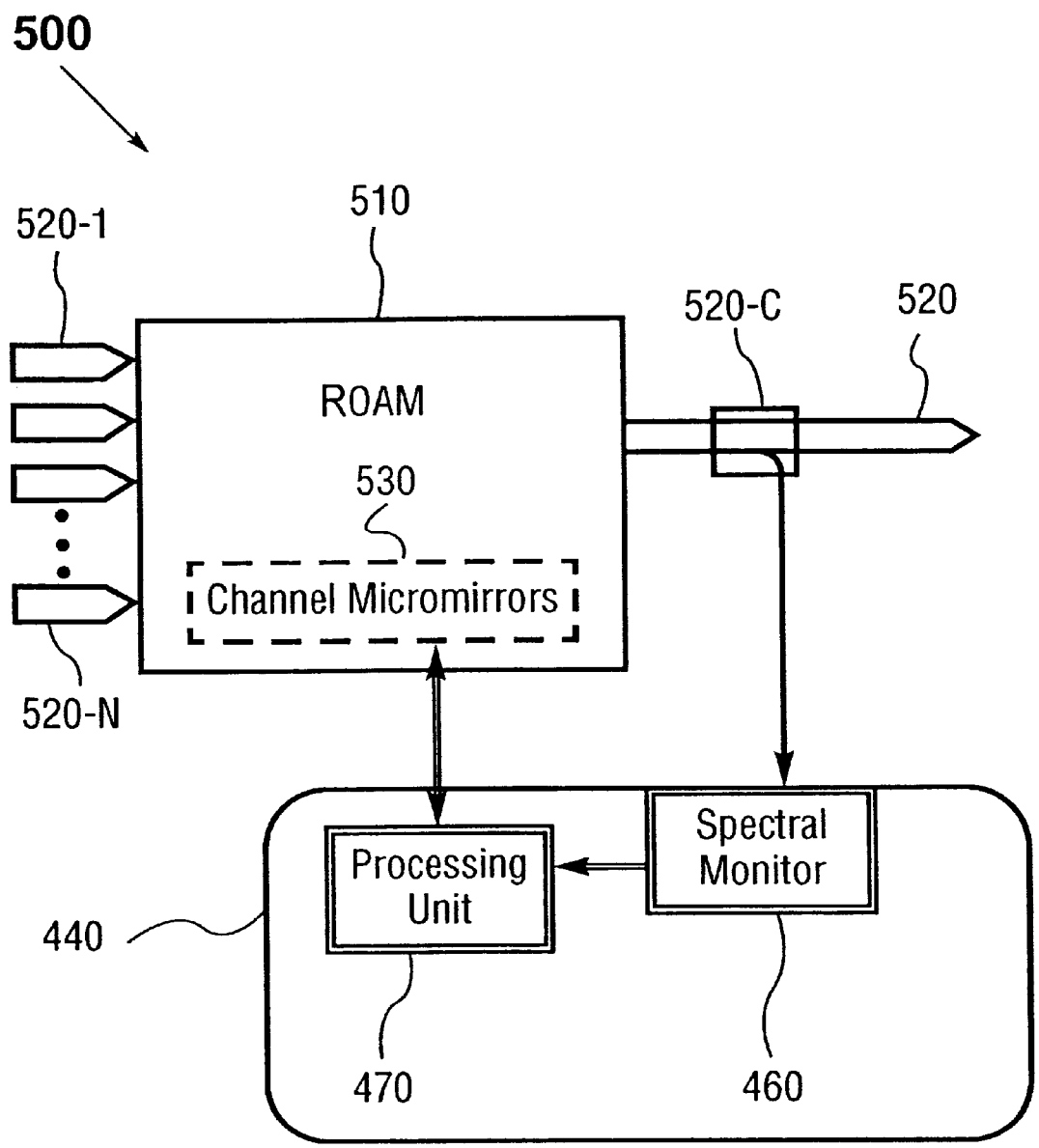
FIG. 5 depicts an exemplary embodiment of a reconfigurable optical add module (ROAM) employing a servo-control assembly, according to the present invention.

An ROAM of the present invention may further incorporate a servo-control assembly, e.g., in a manner as depicted above with respect to the embodiment of FIG. 4A (or 4B). FIG. 5 depicts an exemplary embodiment of how an ROAM may be configured with a servo-control assembly, according to the present invention. By way of example, the embodiment of FIG. 5 may be built upon the embodiment of FIG. 4A, hence the elements labeled with identical numerals. In this case, the ROAM 510 may merely be the WSR apparatus 410 of FIG. 4A operated in reverse, whereby the output ports 420-1 through 420-N of FIG. 4A function as the input ports 520-1 through 520-N of FIG. 5; and the input port 420 of FIG. 4A serves as the output port 520 of FIG. 5. The spectral monitor 460 of the servo-control assembly 440 may be coupled to the output port 520 by a fiber-optic couplers 520-C, whereby a predetermined fraction of the optical signal in the output port 520 is "tapped off" and diverted to the spectral monitor 460. The processing unit 470, in communication with the spectral monitor 460 and the channel micromirrors 530 of the ROAM 510, uses the optical power measurements from the spectral monitor 460 to provide feedback control of the channel micromirrors 530 on an individual basis, so as to maintain the coupling efficiencies of the spectral channels in the output port 520 at desired values. (In the event that the ROAM also employs an array of collimator-alignment mirrors, the servo-control assembly may also provide control of the collimator-alignment mirrors, e.g., in a manner as illustrated in FIG. 4B.)

The RODMs and ROAMs of the present invention may be utilized as building blocks for constructing a variety of optical networking systems, such as reconfigurable optical add-drop multiplexers (OADMs), as exemplified in the following.

Figure 6:
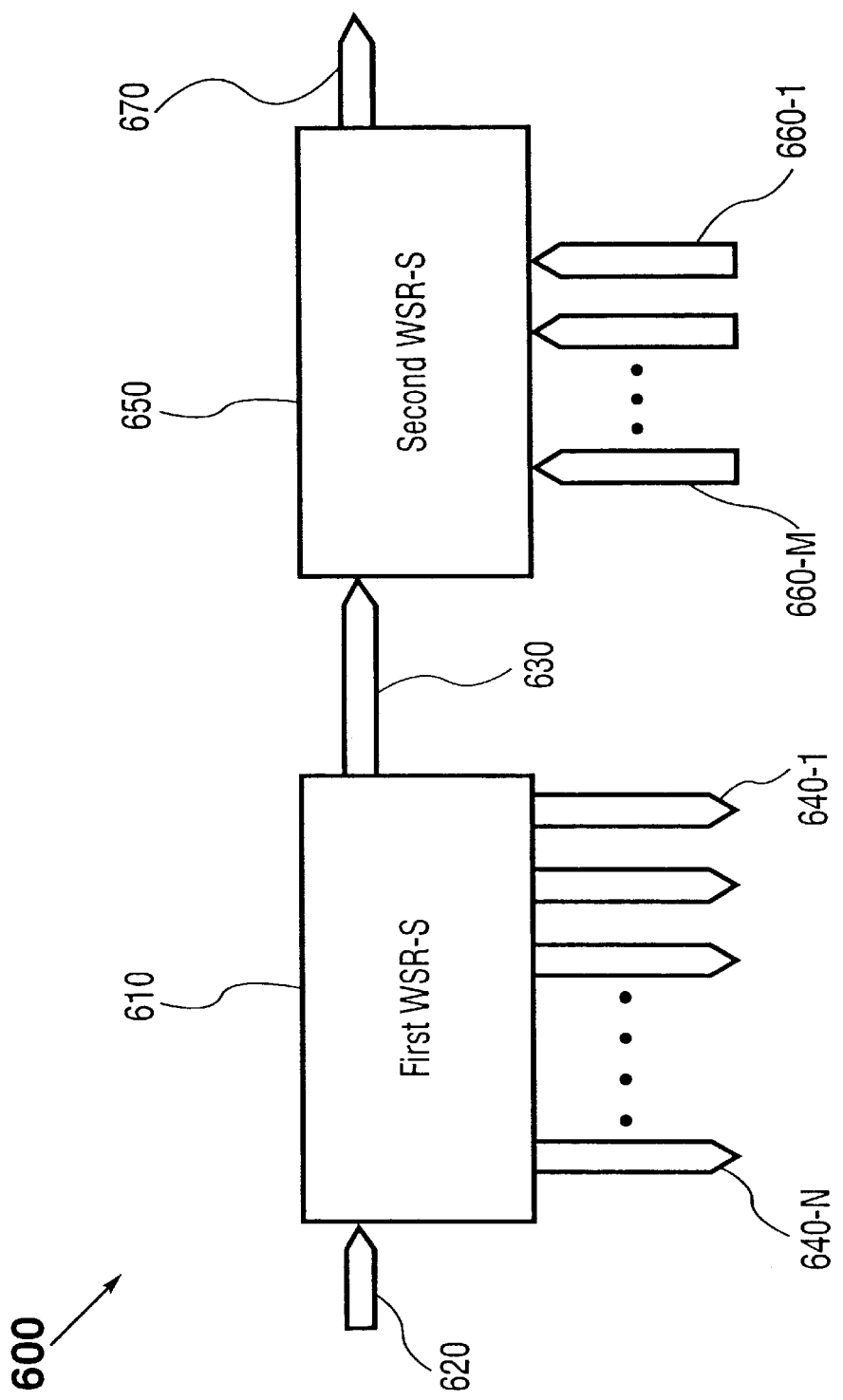
FIG. 6 shows an alternative embodiment of an OADM according to the present invention.

FIG. 6 depicts an alternative embodiment of an optical add-drop multiplexer (OADM) according to the present invention. By way of example, OADM 600 comprises a first WSR-S apparatus 610 optically coupled to a second WSR-S apparatus 650. By way of example, the first WSR-S apparatus 610 may be embodied according to FIG. 4A (or 4B), and the second WSR-S apparatus 650 may be in the embodiment of FIG. 5. The first WSR-S apparatus 610 includes an input port 620, a pass-through port 630, and one or more drop ports 640-1 through 640-N (N≧1). The pass-through spectral channels from the pass-through port 630 are further coupled to the second WSR-S apparatus 650, along with one or more add spectral channels emerging from add ports 660-1 through 660-M (M≧1). In this exemplary case, the pass-through port 630 and the add ports 660-1 through 660-M constitute the input ports for the second WSR-S apparatus 650. The second WSR-S apparatus (or ROAM) 650 serves to multiplex the pass-through spectral channels and the add spectral channels, and route the multiplexed optical signal into an exiting port 670 to provide an output signal for the system.

Those skilled in the art will recognize that in the embodiment of FIG. 6, one WSR-S apparatus (e.g., the first WSR-S apparatus 610) serves as an RODM, effective to perform dynamic drop function. The other WSR-S apparatus (e.g., the second WSR-S apparatus 650) functions as an ROAM, providing dynamic add function. And there are essentially no fundamental restrictions on the wavelengths that can be added or dropped (other than those imposed by the overall communication system). Moreover, the underlying OADM architecture thus presented is intrinsically scalable and can be readily extended to provide several cascaded WSR systems (or RODMs and ROAMs). Additionally, the OADM of FIG. 6 may be operated in reverse, e.g., by using the input ports as the output ports, the drop ports as the add ports, and vice versa.

Those skilled in the art will recognize that the aforementioned embodiment provides one of many embodiments of a dynamically reconfigurable OADM according to the present invention. Those skilled in the art will also appreciate that various changes, substitutions, and alternations can be made herein without departing from the principles and the scope of the invention as defined in the appended claims. Accordingly, a skilled artisan can design an OADM in accordance with the principles of the present invention, to best suit a given application.

Although the present invention and its advantages have been described in detail, it should be understood that various changes, substitutions, and alternations can be made herein without departing from the principles and the scope of the invention. Accordingly, the scope of the present invention should be determined by the following claims and their legal equivalents.

What is claimed is:

1. An optical apparatus, comprising:
   a) a plurality of input ports for receiving input optical signals and an output port;
   b) a wavelength-separator, for separating said input optical signals from said input ports by wavelength into respective spectral channels;
   c) a beam-focuser, for focusing said spectral channels into corresponding spectral spots; and
   d) an array of channel micromirrors positioned to receive said spectral channels, said channel micromirrors being individually and continuously controllable to reflect a subset of said spectral channels into said output port.

2. The optical apparatus of claim 1 further comprising a servo-control assembly, including a spectral monitor for monitoring optical power levels of said reflected spectral channels into said output port, and a processing unit responsive to said optical power levels for providing control of said channel micromirrors.

3. The optical apparatus of claim 2 wherein said servo-control assembly maintains said optical power levels at a predetermined value.

4. The optical apparatus of claim 1 wherein said plurality of input ports and said output port comprise fiber collimators.

5. The optical apparatus of claim 4 further comprising an array of collimator-alignment mirrors, in optical communication with said wavelength-separator and said fiber collimators, for adjusting alignment of said input optical signals from said input ports respectively and directing said reflected spectral channels into said output port.

6. The optical apparatus of claim 5 wherein each collimator-alignment mirror is rotatable about at least one axis.

7. The optical apparatus of claim 5 further comprising first and second arrays of imaging lenses, in a telecentric arrangement with said collimator-alignment mirrors and said fiber collimators.

8. The optical apparatus of claim 1 wherein each channel micromirror is pivotable about one axis.

9. The optical apparatus of claim 1 wherein each channel micromirror is pivotable about two axes.

10. The optical apparatus of claim 9 wherein said plurality of input ports and said output port are arranged in a two-dimensional array.

11. The optical apparatus of claim 1 wherein each channel micromirror is a silicon micromachined mirror.

12. The optical apparatus of claim 1 wherein said plurality of input ports and said output port are arranged in a one-dimensional array.

13. The optical apparatus of claim 1 wherein said beam-focuser comprises at least one focusing lens having first and second focal planes.

14. The optical apparatus of claim 13 wherein said wavelength-separator and said channel micromirrors are placed respectively in said first and second focal planes.

15. The optical apparatus of claim 1 wherein said wavelength-separator comprises an element selected from the group consisting of ruled diffraction gratings, holographic diffraction gratings, echelle gratings, curved diffraction gratings, and dispersing prisms.

16. The optical apparatus of claim 1 further comprising a quarter-wave plate optically interposed between said wavelength-separator and said channel micromirrors.

17. The optical apparatus of claim 1 wherein said input optical signals contain no common wavelengths.

18. The optical apparatus of claim 17 wherein each channel micromirror receives a unique one of said spectral channels.

19. The optical apparatus of claim 1 wherein said input optical signals contain a plurality of common wavelengths.

20. The optical apparatus of claim 19 wherein at least one channel micromirror receives a plurality of said spectral channels, said at least one channel micromirror being controlled such to reflect a selected one of said received spectral channels into said output port.

21. An optical apparatus comprising:
    a) a plurality of input ports for receiving input optical signals and an output port;
    b) a wavelength-separator, for separating said input optical signals from said input ports by wavelength into respective spectral channels;
    c) a beam-focuser, for focusing said spectral channels into corresponding spectral spots;
    d) an array of channel micromirrors positioned to receive said spectral channels, said channel micromirrors being individually and continuously controllable to reflect a subset of said spectral channels into said output port; and
    e) an array of collimator-alignment mirrors, for adjusting alignment of said input optical signals from said input ports respectively and directing said reflected spectral channels into said output port.

22. The optical apparatus of claim 21 further comprising a servo-control assembly, including a spectral monitor for monitoring optical power levels of said spectral channels coupled into said output port, and a processing unit responsive to said optical power levels for providing control of said channel micromirrors.

23. The optical apparatus of claim 22 wherein said servo-control assembly maintains said optical power levels at a predetermined value.

24. The optical apparatus of claim 21 wherein each collimator-alignment mirror is rotatable about at least one axis.

25. The optical apparatus of claim 21 wherein each channel micromirror is continuously pivotable about one axis.

26. The optical apparatus of claim 21 wherein each channel micromirrors is pivotable about two axes.

27. The optical apparatus of claim 26 wherein said plurality of input ports and said output port are arranged in a two-dimensional array.

28. The optical apparatus of claim 27 wherein said collimator-alignment mirrors are arranged in a two-dimensional array.

29. The optical apparatus of claim 21 further comprising first and second arrays of imaging lenses, in a telecentric arrangement with said collimator-alignment mirrors and said plurality of input ports along with said output port.

30. The optical apparatus of claim 21 wherein said wavelength-separator comprises an element selected from the group consisting of ruled diffraction gratings, holographic diffraction gratings, echelle gratings, curved diffraction gratings, and dispersing prisms.

31. The optical apparatus of claim 21 wherein said plurality of input ports and said output port are in a one-dimensional array.

32. The optical apparatus of claim 31 wherein said collimator-alignment mirrors are in a one-dimensional array.

33. The optical apparatus of claim 21 wherein said plurality of input ports and said output port comprise fiber collimators.

34. A method of performing dynamic wavelength multiplexing, comprising:
    a) receiving input optical signals from a plurality of input ports;
    b) separating said input optical signals by wavelength into respective spectral channels;
    c) focusing said spectral channels onto an array of channel micromirrors; and
    d) dynamically and continuously controlling said channel micromirrors, so as to reflect a subset of said spectral channels into an output port.

35. The method of claim 34 further comprising the steps of monitoring optical power levels of said reflected spectral channels into said output port and providing feedback control of said channel micromirrors.

36. The method of claim 35 further comprising the step of maintaining said optical power levels at predetermining values.

37. The method of claim 34 wherein step d) comprises reflecting each of said spectral channels into said output port.

38. The method of claim 34 wherein a plurality of said spectral channels impinge onto a particular channel micromirror, and wherein step d) includes controlling said particular channel micromirror so as to reflect a selected one of said received spectral channels into said output port.

* * * * *